No. 644,137. Patented Feb. 27, 1900.
O. H. JEWELL.
METHOD OF PURIFYING WATER.
(Application filed Sept. 7, 1897.)
(No Model.)
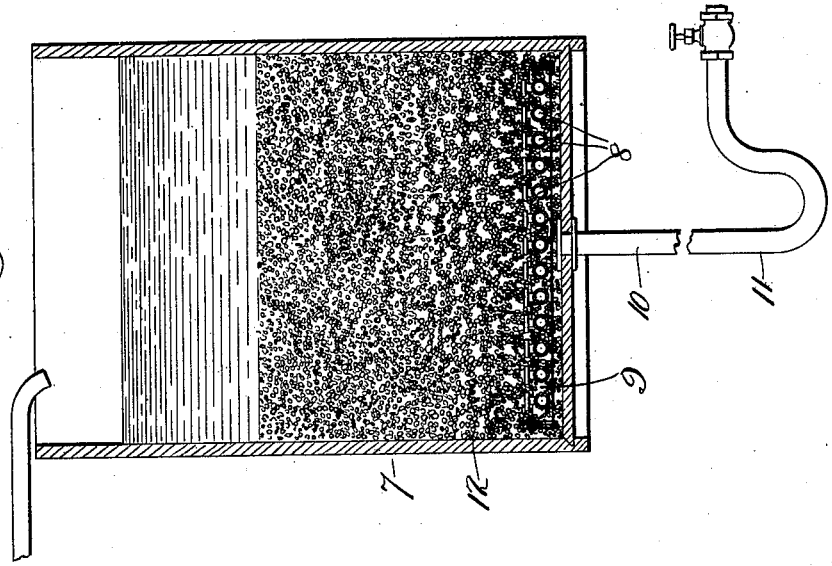
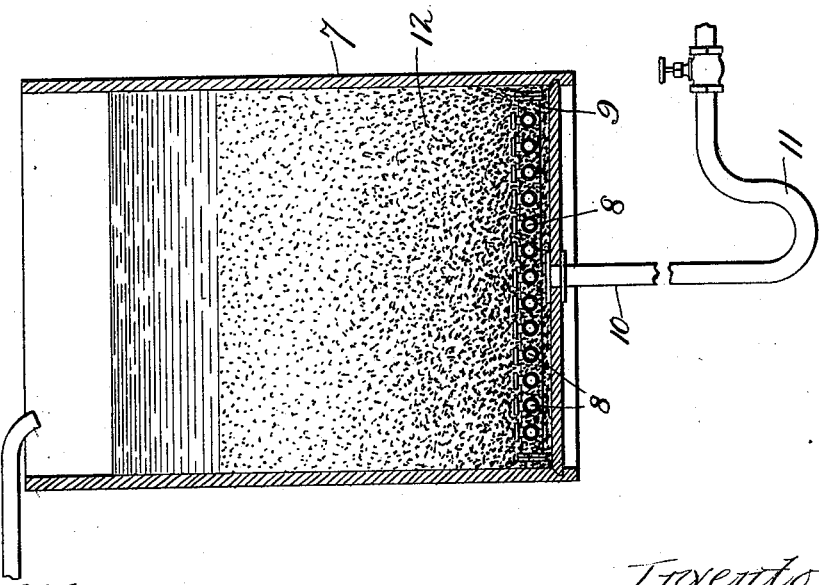

UNITED STATES PATENT OFFICE.

OMAR H. JEWELL, OF CHICAGO, ILLINOIS, ASSIGNOR TO THE O. H. JEWELL FILTER COMPANY, OF SAME PLACE.

METHOD OF PURIFYING WATER.

SPECIFICATION forming part of Letters Patent No. 644,137, dated February 27, 1900.

Application filed September 7, 1897. Serial No. 650,734. (No model.)

*To all whom it may concern:*

Be it known that I, OMAR H. JEWELL, a citizen of the United States, residing in Chicago, in the county of Cook and State of Illinois, have invented a certain new and useful Method of Purifying Water, of which the following is a specification.

My invention relates to purifying waters for potable purposes by filtering such waters through granular filters. As is well known, the principal object of filtering the water-supply of towns and cities is to remove the suspended impurities, which in many instances are in a finely-divided state, and experience has proven that granular filters—that is to say, filters in which the water is caused to percolate through a filter-bed composed of loose sand or other granular material—furnish a filtering medium which is best adapted for removing the suspended impurities while permitting the water to flow at a rapid rate, as is necessary where the water-supply of a town or city is being filtered. In using granular filters heretofore, however, it has been found that in most instances a granular filter-bed will not intercept and retain the suspended matter in its normal condition, and it has therefore been found necessary in almost all instances to introduce a coagulant, such as alum, into the water before filtration, the coagulant serving to coagulate the suspended matter into masses which are larger and more susceptible of interception and retention by the granular particles composing the filter-bed, in some instances it being necessary to use such a large quantity of alum as to affect the taste of the filtered water.

My present invention consists of an improved process of purifying water by filtration through a granular filter-bed by which the necessity of the use of alum or other coagulant is in many instances entirely avoided, and in other instances, where the impurities are in an exceptionally finely-divided state, the quantity of alum which under former processes would be necessary is very greatly reduced.

To this end my invention consists in effecting what may be termed the "coagulation" of the suspended impurities of the water by suction while passing through the filter-bed, the particles of suspended matter being thereby caused to come together into masses of sufficient size and of such character as to be readily intercepted and retained by the granules composing the filter-bed.

My invention further consists in applying the suction principally at the lower portion of the filter-bed, so that it acts more strongly upon the finer particles of suspended matter which have passed through the upper portion of the filter-bed.

My invention further includes the compacting of the filter-bed in such manner that the lower portion thereof will be of the greatest density, the density gradually decreasing toward its upper surface, as by this means, while the larger masses of impurities will be retained by the more widely separated granules at the upper portion of the bed, the lower portion of the bed will be sufficiently dense and compact to intercept the smaller particles of suspended matter, especially after they have been coagulated, as above stated.

In the accompanying drawings I have shown apparatus designed to utilize my improved process, such apparatus in general consisting of a filter-bed of loose granular material contained in a suitable receptacle and a pure-water pipe in the bottom of said receptacle, said pipe being provided with suitable strainers to prevent the granular material from entering such pipe and with an off-carrying pipe vertically arranged and of such length that as the filtered water is carried off by said pipe a partial vacuum will be created within the filter-bed, the vacuum being greatest in the lower portion of the bed and gradually diminishing toward the upper surface thereof. By this means a continuous suction is exerted which is greatest in the lower portion of the bed, compacting it so that its density will be greatest at the bottom and will gradually diminish toward the upper surface thereof. Furthermore, the suction causes the air contained in the water in the filter to separate and concentrates it, the minute bubbles coming together, forming larger bodies of air, which are to a great extent retained within the filter-bed. As the fine air-bubbles converge they act to concentrate and coagulate the particles of suspended matter, so that finally the suspended matter is formed into larger bodies, which may easily be intercepted and retained by the filtering material. As the process of filtration continues the air extracted from the water gradually accumulates in the bed, still further compacting it and increasing the efficiency of the filter to such an extent that even though the bed contain large quantities of impure matter extracted from the water the filter may nevertheless be continued in use with satisfactory results, thus making it unnecessary to wash the bed as frequently as has been necessary with other forms of filters employing granular filter-beds.

Referring to the accompanying drawings for a more detailed description of my invention, Figure 1 is a vertical section of a filter-tank, illustrating the condition of the granular filter-bed soon after the filtration has commenced. Fig. 2 is a similar view showing the condition of the filter-bed after filtration has continued for some considerable time. Figs. 3, 4, 5, and 6 are magnified views illustrating the manner in which the coagulation of the suspended particles is effected.

In the drawings, 7 indicates the filter-tank.

8 indicates a series of strainers arranged therein and communicating with a manifold 9.

10 indicates a pure-water pipe which communicates with the manifold 9 and extends downward a sufficient distance to provide the necessary downdraft, usually several feet.

11 indicates a water-trap at the lower end of the pipe 10.

12 indicates the granular filter-bed.

Referring to Fig. 1, which, as above stated, illustrates the condition of the granular material soon after filtration has commenced in accordance with my new process, it will be noted that the granular matter in the lower portion of the bed is compacted to a much greater extent than that at the upper portion thereof, the degree of compactness gradually diminishing as the surface of the bed is approached. Such compacting of the bed is effected by the creation of a partial vacuum, principally in the lower portion of the bed, by means of the downdraft through the pipe 10. By thus compacting the bed it is much better adapted for removing the finer particles of suspended matter than would be the case were the bed of uniform density. Furthermore, the entire body of filtering material is utilized instead of substantially the upper surface only, as in prior constructions.

In Fig. 2 it will be noted that in the lower portion of the bed there are a number of air-spaces, the larger air-spaces being at the lower portion of the bed. Such spaces are formed in the bed by the accumulation of the air extracted from the water by suction, as hereinbefore described. After the air has performed its office of coagulating the suspended matter it accumulates within the bed, as illustrated, and afterward is especially useful in washing the bed, as when the current of water is reversed for the purpose of washing the air being liberated rises through the bed and escaping agitates it violently, thereby freeing all the accumulated impurities, so that they may be carried off with the wash-water.

The manner in which the impurities are coagulated by the extraction and concentration of the air contained in the water is clearly illustrated in Figs. 3, 4, 5, and 6. Fig. 3 illustrates, on a magnified scale, the condition of the air and the minute suspended impurities in the water, the circles representing air-bubbles and the black marks the suspended impurities. It will be noted that the air-bubbles, as well as the impurities, are at first comparatively widely separated from each other. After suction has been applied to the filter-bed for a short time the air-bubbles are drawn together, carrying with them the suspended matter, as shown in Figs. 4 and 5, until, as shown in Fig. 6, the air-bubbles finally come together, forming larger bubbles, the suspended impurities also coming together, forming clots or masses of sufficient size to be intercepted and retained by the granules of the filter-bed. In this way, with many waters, practically all the suspended impurities will be coagulated and removed without the use of a chemical coagulant, while with those waters in which coagulants must be used the quantity of the coagulant which it is necessary to use is greatly reduced.

While in the apparatus shown in the drawings the necessary vacuum is secured by the action of the pure-water discharge, I do not limit myself to securing the vacuum in that way, as other means may be employed to secure such result. I prefer the apparatus shown, however, as by it the suction is applied uniformly through the lower portion of the bed and is substantially uniform in any given stratum.

I am aware that heretofore atmospheric pressure has been employed to force water through filtering material, such as stone or felt, but such use has been simply for the purpose of forcing the water through the filtering substance and has not effected the extraction and concentration in the filtering material of all or a part of the air contained in the water or the coagulation or agglomeration of the impurities, as described; nor has it secured a bed of filtering material of varying density or compactness. My invention, therefore, does not contemplate the use of filtering materials such as those above referred to, but is limited to the use of a granular filtering material having an exposed filtering-surface, by which I mean a surface uncovered by felt or similar material which would prevent its use in connection with my improved process.

That which I claim as my invention, and desire to secure by Letters Patent, is—

1. The method of purifying water which consists in passing the impure water through a granular filter-bed having an exposed filtering-surface, and at the same time applying suction from below, substantially as described.

2. The method of purifying water which consists in passing the impure water downward through a granular filter-bed of gradually-increasing compactness from the top downward, and at the same time applying suction from below, substantially as described.

3. The method of purifying water which consists in passing the impure water through a granular filter-bed having an exposed filtering-surface, and at the same time extracting from the water by suction and retaining within the filter-bed, a greater or less portion of the air contained in the water, substantially as described.

OMAR H. JEWELL.

Witnesses:
JOHN L. JACKSON,
ALBERT H. ADAMS.